(12) United States Patent
Roh

(10) Patent No.: US 7,474,697 B2
(45) Date of Patent: *Jan. 6, 2009

(54) APPARATUS AND METHOD FOR PARTITIONING MOVING PICTURE DATA

(75) Inventor: Kyu Chan Roh, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 529 days.

This patent is subject to a terminal disclaimer.

(21) Appl. No.: 11/189,963

(22) Filed: Jul. 25, 2005

(65) Prior Publication Data
US 2005/0254580 A1   Nov. 17, 2005

Related U.S. Application Data

(62) Division of application No. 10/647,937, filed on Aug. 25, 2003, now Pat. No. 6,956,900.

(30) Foreign Application Priority Data
Mar. 6, 2003   (KR)   ............... 2003-14095

(51) Int. Cl.
    *H04B 1/66* (2006.01)
(52) U.S. Cl. ............ 375/240.03; 375/240.25; 375/240.26; 375/240.2; 375/240.04; 375/240.06; 382/251; 382/233; 382/235; 382/250

(58) Field of Classification Search ............ 375/240.03, 375/240.25, 240.26, 240.2, 240.04, 240.06; 382/251, 233, 235, 250
    See application file for complete search history.

(56) References Cited

U.S. PATENT DOCUMENTS

| | | | |
|---|---|---|---|
| 5,420,636 A * | 5/1995 | Kojima | ............... 348/403.1 |
| 5,500,677 A | 3/1996 | Fert | |
| 5,729,293 A * | 3/1998 | Keesman | ............... 375/240.15 |
| 5,825,970 A | 10/1998 | Kim | |
| 6,055,272 A | 4/2000 | Kim | |
| 6,615,335 B1 | 9/2003 | Kleihorst et al. | |
| 6,956,900 B2 * | 10/2005 | Roh | ............... 375/240.03 |

FOREIGN PATENT DOCUMENTS

| | | |
|---|---|---|
| KR | 10-2000-0032248 | 6/2000 |
| KR | 10-2002-0028200 | 4/2002 |

* cited by examiner

*Primary Examiner*—Shawn An
(74) *Attorney, Agent, or Firm*—Lee, Hong, Degerman, Kang & Waimey

(57) ABSTRACT

An apparatus for partitioning moving picture data comprises a first quantizing unit for first-quantizing a received video signal and outputting a first-quantized signal; and a second quantizing unit for second-quantizing the first-quantized signal and partitioning the first-quantized signal into a preceding part and a succeeding part.

6 Claims, 9 Drawing Sheets

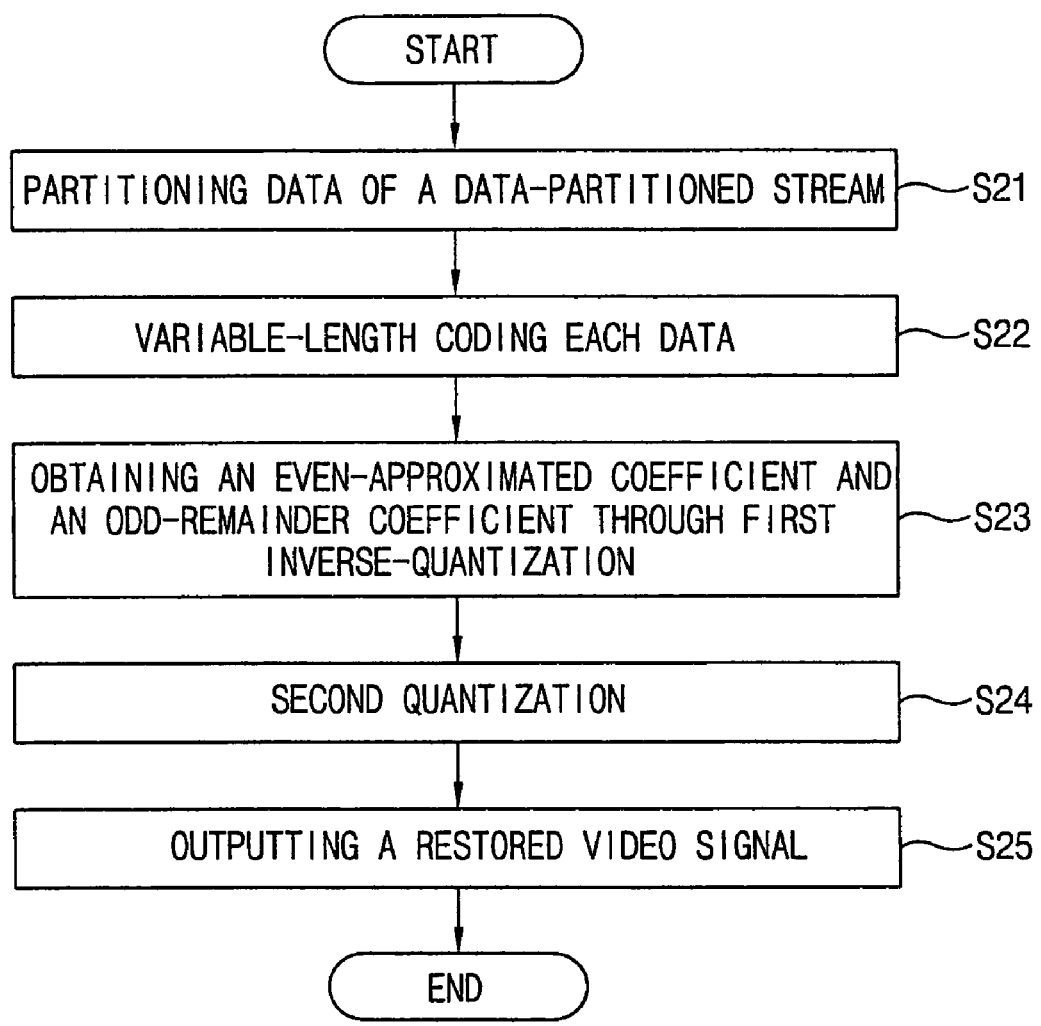

US 7,474,697 B2

APPARATUS AND METHOD FOR PARTITIONING MOVING PICTURE DATA

CROSS-REFERENCE TO RELATED APPLICATIONS

This application is a divisional of U.S. application Ser. No. 10/647,937, filed Aug. 25, 2003, now U.S. Pat. No. 6,956,900 which claims the benefit of Korean Patent Application No. 2003-14095, filed on Mar. 6, 2003, which is hereby incorporated by reference in its entirety.

BACKGROUND OF THE INVENTION

1. Field of the Invention

The present invention relates to an apparatus and a method for partitioning moving picture data and, in particular, to an apparatus and a method for partitioning DCT coefficient information in order to perform error tolerance transmission of moving picture information.

2. Description of the Background Art

According to popularization of digital image services such as a digital TV broadcast including a high definition TV, a digital versatile disc (DVD) is attracting public attention as a new multimedia device. MPEG (moving picture experts group) is the international standard for defining streaming video and audio over a communication network. It is regulated by the ISO/IEC (international electrotechnical commission) of the ISO (international standard organization). Standardization of MPEG has proceeded with the cooperation of the international telecommunication union (ITU).

The MPEG standard partly concerns coding video and audio information stored in a digital storage medium. However, at present its application is expanded to multimedia database access or radio multimedia communication. In particular, MPEG-2 has been developed as a multimedia standard for next generation broadcast, such as a HDTV and a digital satellite broadcast. Presently MPEG-4 is a multimedia coding method, and it is a kind of system protocol for defining interface with a communication network.

FIG. 1 is a block diagram illustrating a construction of an encoder used for a data partitioning method in accordance with the conventional art. As depicted in FIG. 1, the encoder includes a first combining unit 1 for adding a received video signal to a compensated signal; a DCT unit 2 for performing DCT (discrete cosine transform) of a signal outputted from the first combining unit 1; a quantizing unit 3 for quantizing a signal of the DCT unit 2; an inverse-quantizing unit 4 for inverse-quantizing a signal outputted from the quantizing unit 3; and an IDCT (inverse discrete cosine transform) unit 5 for performing IDCT of a signal outputted from the inverses-quantizing unit 4.

Also included are a second combining unit 6 for combining an output signal of the IDCT unit 5 with an output signal of a motion compensating unit 9; a frame memory 7 for clipping and storing a signal outputted from the second combining unit 6; a motion judging unit 8 for estimating motion through a signal of the frame memory 7 and a received video signal; a motion compensating unit 9 for compensating motion by reflecting the estimation judged in the motion judging unit 8 in the signal stored in the frame memory 7; and a data partitioning unit 10 for receiving a result judged in the motion judging unit 8 and the signal of the quantizing unit 3 and outputting data-partitioned streams.

The data partitioning method is a technique for partitioning a video stream into not less than two parts. The data partitioning method used for encoding standardization is for separating motion information and metro block header from a DCT coefficient. In video stream transmission, if part of texture information consisting of the DCT coefficient is lost, the texture information is disregarded, and accordingly reproduction screen is constructed only with motion information. However, in an encoding frame in a screen, because there is no motion information, the DCT coefficient loss has a bad effect upon a picture quality of a moving picture.

In order to reduce an error due to the DCT coefficient loss, a spectrum separation method for separating the DCT coefficient into two parts has been presented. In the DCT coefficient, visually important low frequency components are allocated to a priority part, and the rest of high frequency components are allocated to a background (lower priority) part.

FIG. 2 shows a bit string structure of the data partitioning method used for the MPEG-2 standard, and arrows (A, B, C, D) indicate decoding orders. In the MPEG-2 standard, the DCT coefficient is divided into a partition 0 corresponding to a priority part and a partition 1 corresponding to a background (lower priority) part, construction part included in the partition 0 is determined by a priority breakpoint. In more detail, by the priority breakpoint value, it is determined whether how many coefficients are included in the priority part (partition 0), and the rest low frequency parts are included in the background part.

The spectrum separation method can provide error immunity about the DCT coefficient, however, picture quality of the priority part is considerably lowered in comparison with a single stream having the same bit rate. Accordingly, when error occurs in the background part, although screen is constructed only with the priority part, there is not such a big gain.

FIGS. 3A and 3B show a bit string structure of the data partitioning method used for the MPEG-4 standard. Herein, FIG. 3A shows frames between screens, and FIG. 3B shows frames in a screen. In frames between screens, a macro block header and motion information are separated from the DCT coefficient and are allocated to the priority part, and the DCT coefficients is allocated to the background part. In frames in a screen, only a DC coefficient is allocated to the priority part with a macro block header, and the rest AC coefficient is allocated to the background part.

In general, when an error occurs in the background part, an encoder has to reconstruct a screen by using the priority part information. In more detail, if the DCT coefficient of the frames between the screens is lost due to a transmission error, the encoder reconstructs the damaged macro block with motion information. If the background part of the frame in the screen is lost due to an error, the encoder has to reconstruct the macro block only with the DC coefficient. In addition, if an error occurs-in the priority part, the encoder has to disregard the encoded all information.

In the current method for partitioning moving picture data, the spectrum separation method does not include all frequencies in the priority part. Therefore, picture quality in the priority part is remarkably lowered in comparison with a single stream having the same bit rate. In more detail, due to error occurred in the background part, a picture quality-lowering problem occurs seriously in reproducing of the screen only with the priority part. A system and method is needed that can overcome the above shortcoming.

SUMMARY OF THE INVENTION

In order to solve the above-mentioned problem, it is an object of the present invention to provide an apparatus and a method for partitioning moving picture data capable of partitioning a DCT coefficient efficiently by performing re-quantization in the conventional data partitioning method.

In accordance with one or more embodiments, an apparatus for partitioning moving picture data comprises a first quantizing unit for first-quantizing a received video signal and outputting a first-quantized signal; and a second quantizing unit for second-quantizing the first-quantized signal and partitioning the first-quantized signal into a preceding part and a succeeding part.

The second quantizing unit comprises a second quantizer for re-quantizing the first-quantized signal to generate an output signal; a first variable length coder (VLC) for variable-length coding the output signal generated by the second quantizer; a second inverse-quantizer for inverse-quantizing the output signal generated by the second quantizer; a third combiner for performing subtraction operation of output signals generated by a first inverse-quantizer and the second quantizer; a second VLC for variable-length coding output signals generated by the third combiner and the second quantizer; and a data partitioner for outputting output signals generated by the second VLC and the first VLC.

The preceding part and the succeeding part comprise at least one frequency component. The second quantizer outputs an even-approximated coefficient as the preceding part by having a quantization interval set to a predetermined value. An output signal of the third combiner is an odd-remainder coefficient as the succeeding part equal to a predetermined value. The odd-remainder coefficient comprises code information when the odd-remainder coefficient is equal to a first value and a pertinent even-approximated coefficient is not equal to a second value.

The first value is approximately 1; the second value is approximately 0, in accordance with one embodiment. Preferably, the odd-remainder coefficient as the succeeding part is equal to approximately 0; the odd-remainder coefficient as the succeeding part is equal to approximately 1, for example.

An apparatus for partitioning moving picture data comprises a coding unit for outputting a stream comprising a DCT coefficient divided into an even-approximated coefficient and an odd-remainder coefficient by first-quantizing and second-quantizing a received video signal; and a decoding unit for obtaining a first-quantized signal by performing inverse-quantization about the stream generated by the coding unit and obtaining a restored video signal by performing inverse-quantization about the first-quantizing.

The coding unit comprises a first quantizer for outputting a first-quantized signal by first-quantizing a received video signal; a second quantizer for outputting an even-approximated coefficient by re-quantizing the first-quantized signal; a first VLC (variable length coder) for variable-length coding an output signal of the second quantizer; a second inverse-quantizer for inverse-quantizing an output signal of the second quantizer; a third combiner for outputting an odd-remainder coefficient by performing subtraction operation of output signals of the second inverse-quantizer and the first quantizer; a second VLC (variable length coder) for variable-length coding output signals of the third combiner and the second quantizer; and a data partitioner for outputting output signals of the second VLC and the first VLC as a data-partitioned stream.

An output signal of the third combiner is an odd-remainder coefficient. The odd-remainder coefficient comprises code information when it is equal to a first value and a pertinent even-approximated coefficient is not equal to a second value. The decoding unit comprises a divider for dividing the data-partitioned stream into a preceding part and a succeeding part; a first VLD (variable length decoder) for outputting an even-approximated coefficient by variable-length decoding the preceding part; a first inverse-quantizer for inverse-quantizing an output signal of the first VLD; a second VLD (variable length decoder) for variable-length decoding the succeeding part; a first combiner for outputting a first-quantized signal by combining an output signal of the first inverse-quantizer with an output signal of the second VLD; and a second inverse-quantizer for outputting a video signal by performing inverse-quantization and inverse discrete cosine transform of the first quantized signal.

A method for partitioning moving picture data, the method comprising outputting a first-quantized signal by first-quantizing a received video signal; partitioning the first-quantized signal into a preceding part and a succeeding part through a second quantization; and outputting an output signal generated as result of the second quantization as a partitioned stream signal. The partitioning step comprises re-quantizing the first-quantized signal to generate a re-quantized signal; variable-length coding the re-quantized signal; inverse-quantizing the re-quantized signal and calculating a difference based on the first-quantized signal; and variable-length coding the calculated difference.

The re-quantized signal is an even-approximated coefficient corresponding to the preceding part. The calculated difference is an odd-remainder coefficient corresponding to the succeeding part. A stream is constructed by inserting a texture marker for separating the preceding part and the succeeding part.

In accordance with one embodiment, a method for partitioning moving picture data, the method comprises generating a first-quantized signal by first-decoding a received stream; and restoring a video signal by second-decoding the first-quantized signal. The generating step comprises dividing the received stream into a preceding part and a succeeding part; variable-length decoding and inverse-quantizing the preceding part; variable-length decoding the succeeding part; and outputting the first-quantized signal by adding the preceding part to the succeeding part. The preceding part is an even-approximated coefficient. The succeeding part is an odd-remainder coefficient.

In accordance with anther embodiment, a system for partitioning moving picture data comprises a first inverse-quantizing mechanism for generating a first-quantized signal by first-quantizing a preceding part and a succeeding part of a data-partitioned stream; and a second inverse-quantizing mechanism for outputting a video signal by performing inverse-quantization and inverse discrete cosine transform of the first quantized signal.

The first inverse-quantizing unit comprises a divider for dividing the received data-partitioned stream into a preceding part and a succeeding part; a first variable length decoder (VLD) for performing variable-length decoding of the preceding part to generate a first output signal; a first inverse-quantizer for inverse-quantizing the first output signal of the first VLD; a second VLD for performing variable-length decoding of the succeeding part; and a first combiner for outputting a first-quantized signal by combining an output signal of the first inverse-quantizer with an output signal of the second VLD.

An output signal of the first VLD is an even-approximated coefficient. An output signal of the second VLD is an odd-remainder coefficient. In some embodiments, a method of partitioning a streaming data comprises quantizing the streaming data to generate a first quantized signal; quantizing the first quantized signal to obtain an even-approximated coefficient; obtaining an odd-remainder coefficient; variable-length coding the even-approximated coefficient and the odd-remainder coefficient; and outputting a data-partitioned stream based on said variable length coding.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 9 is a flow chart illustrating a method for partitioning moving picture data in decoding in accordance with one embodiment of the present invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENT

Figure 1:
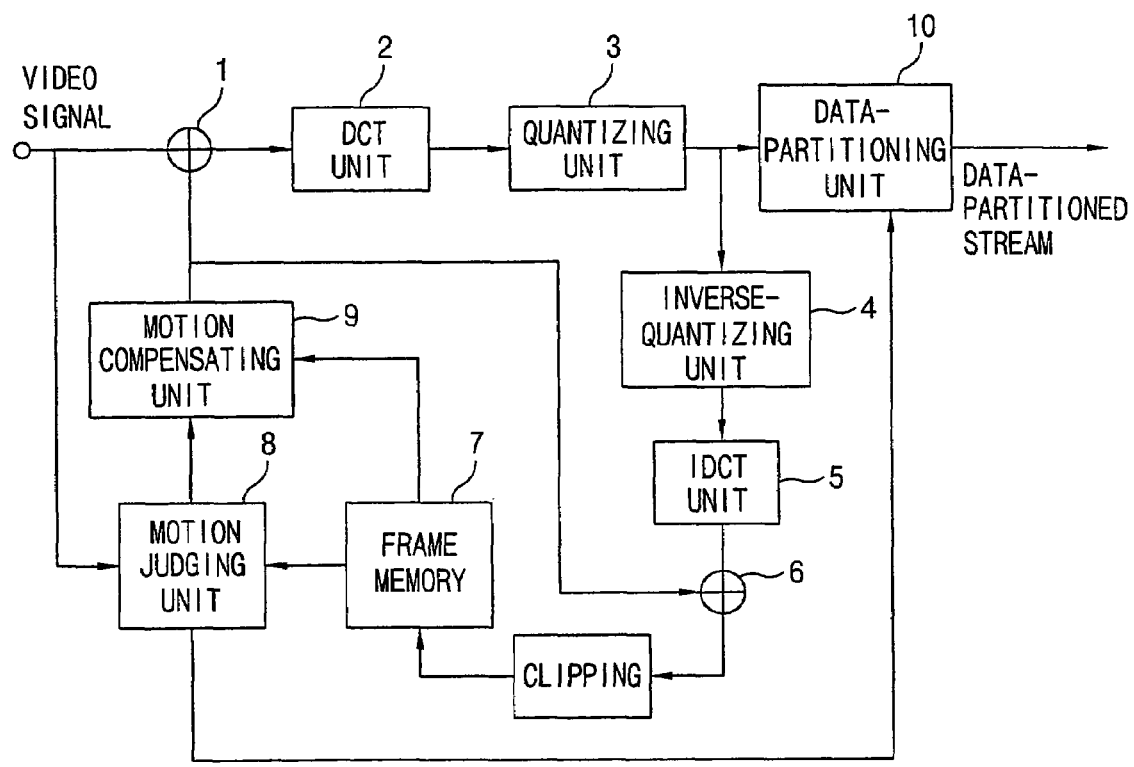
FIG. 1 is a block diagram illustrating an encoder used for a data partitioning method in accordance with the related art.
Figure 2:
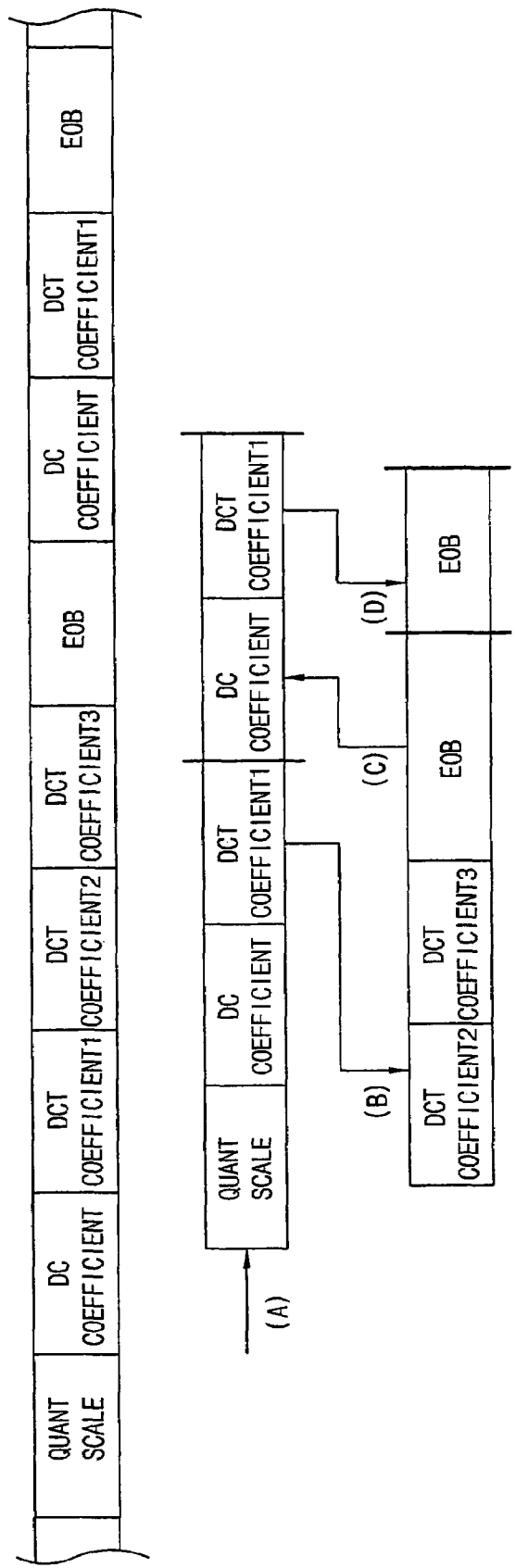
FIG. 2 shows a bit string structure of the data partitioning method used for the MPEG-2 standard.
Figure 3A:
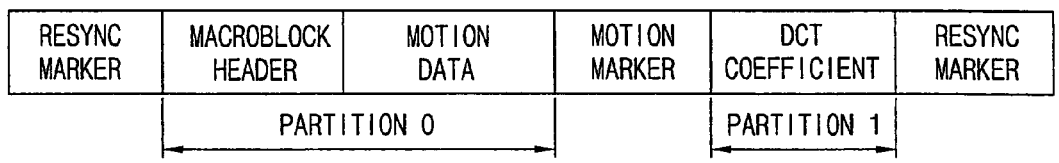
FIG. 3A shows a bit string structure of frames between screens of a data partitioning method used for the MPEG-4 standard.
Figure 3B:
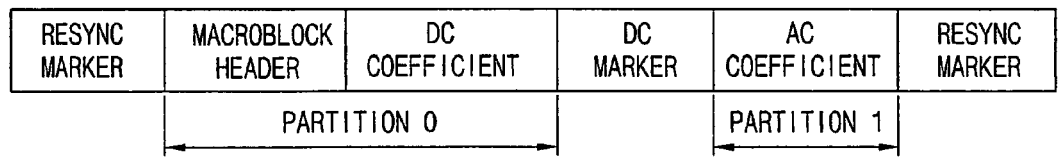
FIG. 3B shows a bit string structure of frames in a screen of the data partitioning method used for the MPEG-4 standard.
Figure 4:
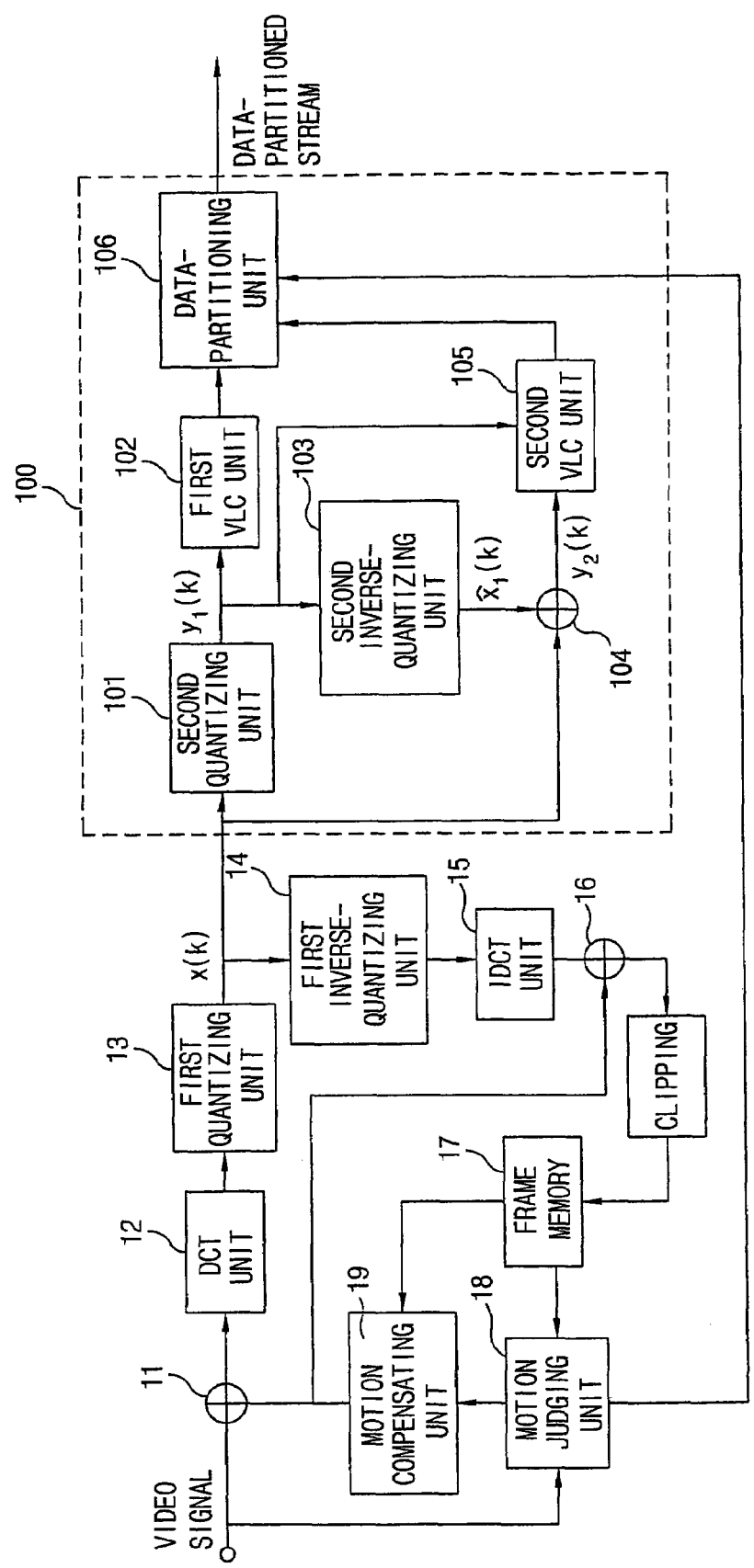
FIG. 4 is a block diagram illustrating a structure of an encoder in an apparatus for partitioning moving picture data in accordance with one embodiment the present invention.

Referring to FIG. 4, a block diagram illustrating a structure of an encoder in an apparatus for partitioning moving picture data in accordance with the present invention is provided. The encoder comprises a first combining unit 11 for adding a received video signal to an output signal of a motion compensating unit 19; a DCT unit 12 for performing DCT (discrete cosine transform) of the signal outputted from the first combining unit 11; a first quantizing unit 13 for quantizing the signal of the DCT unit 12; a first inverse-quantizing unit 14 for inverse-quantizing the signal outputted from the first quantizing unit 13; an IDCT (inverse discrete cosine transform) unit 15 for performing IDCT of the signal outputted from the first inverse-quantizing unit 14; a second combining unit 16 for combining the output signal of the IDCT unit 15 with the output signal of the motion compensating unit 19; a frame memory 17 for clipping and storing the signal outputted from the second combining unit 16; a motion judging unit 18 for estimating motion through the signal of the frame memory 17 and a received video signal; a motion compensating unit 19 for compensating motion by reflecting the judged result of he motion judging unit 18 upon the signal stored in the frame memory 17; and a second quantizing unit 100 for outputting a data-partitioned stream by re-quantizing the output signal of the first quantizing unit 13.

The second quantizing unit 100 comprises a second quantizer 101 for re-quantizing a signal outputted from the first quantizing unit 13; a fist VLC (variable length coding) unit 102 for performing VLC (variable length coding) of a signal outputted from the second quantizer 101; a second inverse-quantizing unit 103 for inverse-quantizing a signal outputted from the second quantizer 101; a third combining unit 104 for performing subtraction operation of an output signal from the second inverse-quantizing unit 103 and an output signal from the first quantizing unit 13; a second VLC unit 105 for performing VLC (variable length coding) of output signals of the third combining unit 104 and the second quantizer 101; and a data partitioning unit 106 for data-partitioning output signals of the second VLC unit 105 and the first VLC unit 102 and outputting them.

The operation of the encoder of the moving picture data partitioning apparatus will be described. The encoder in accordance with one embodiment of the present invention partitions a DCT coefficient into a preceding part as a priority part and a succeeding part as a lower priority part. The preceding part is a stream generated through the first quantizing unit 13 and the second quantizer 101, and the succeeding part is a quantizing error signal as a difference between the output signal of the first quantizing unit 13 and the preceding part signal. In more detail, the DCT coefficient is partitioned into $y_1(k)$ as a stream generated by the second quantizer 101 and the succeeding part is a quantizing error signal as a difference between the output signal of the first quantizing unit 13 and the preceding part signal. In more detail, the DCT coefficient is partitioned into $y_1(k)$ as a stream generated by the second quantizer 101 and $y_2(k)$ as a quantizing error signal between they $y_1(k)$ and the output signal of the first quantizing unit 13.

When a quantizing interval of the second quantizer 101 is N, $y_1(k)$ can be defined as following.

$$y_1 = sgn(x(k)) \left\lfloor \frac{|x(k)|}{N} \right\rfloor \qquad \text{(Equation 1)}$$

$$sgn(x) = \begin{cases} 1, & x \geq 0 \\ -1, & x < 0 \end{cases} \qquad \text{(Equation 2)}$$

$$\hat{x}(k) = Ny_1(k), \ 1 \leq k \leq 64 \qquad \text{(Equation 3)}$$

$$y_2(k) = x(k) - \hat{x}(k) = x(k) - Ny_1(k) \qquad \text{(Equation 4)}$$

Herein, $\lfloor x \rfloor$ is a maximum constant not greater than x, $\hat{x}(k)$ is a reproduction value of the preceding part restored through the second quantizer 101, and $y_2(k)$ is a coefficient of the succeeding part.

Unlike the MPEG-2 or MPEG-4 data partitioning method, in the present invention, after making an approximate stream including high frequency component through re-quantization of a signal, another stream is constructed through a difference in value between the signal (approximate stream) and the signal before the re-quantization.

Herein, if the quantization interval N is defined as 2, the coefficient $y_1(k)$ of the preceding part is an even-approximated coefficient of a first-quantized signal (x(k)) outputted from the first quantizing unit 13, and the coefficient $y_2(k)$ of the succeeding part is an odd-remainder value generated by the even-approximation of the preceding part.

Figure 5:
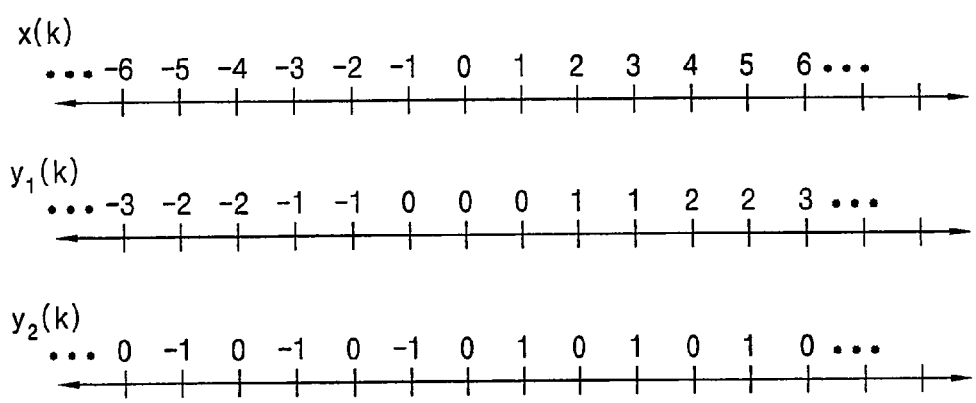
FIG. 5 shows a method for partitioning data in accordance with one embodiment of the present invention.

Referring to FIG. 5, a first-quantized signal (x(k)), a preceding part and a succeeding part partitioned by even-approximation are provided. Because the succeeding part coefficient is the odd-remainder of the first-quantized signal, they can be described as −1, 0, 1. Because an absolute value of the succeeding part coefficient is binary numeral, it can be described as a one-dimensional run-length code. In addition, code of the succeeding part coefficient is same with that of the preceding part coefficient. When the preceding part coefficient is 0 and the succeeding part coefficient is not 0 ($y_1(k)$=0, $y_2(k)\neq 0$), for example, additional code information as is inserted (e.g., at 1 bit). Accordingly, efficient encoding can be performed by reducing the bit number of the succeeding part.

Figure 6A:
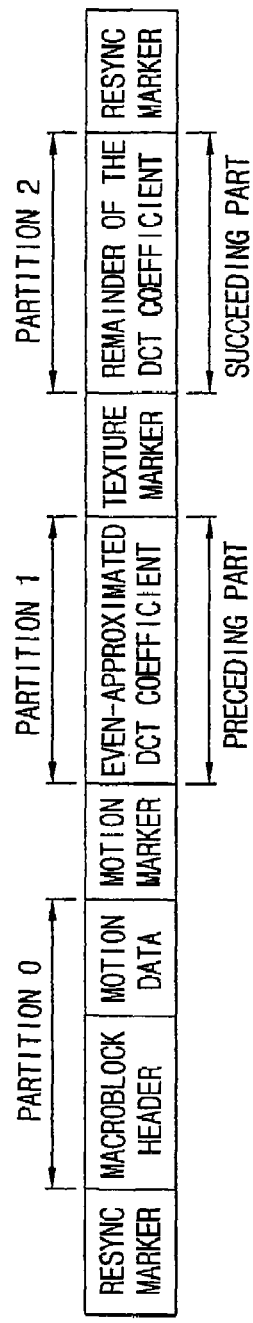
FIGS. 6A and 6B show a bit string structure of a method for partitioning data in accordance with one embodiment of the present invention.
Figure 6B:
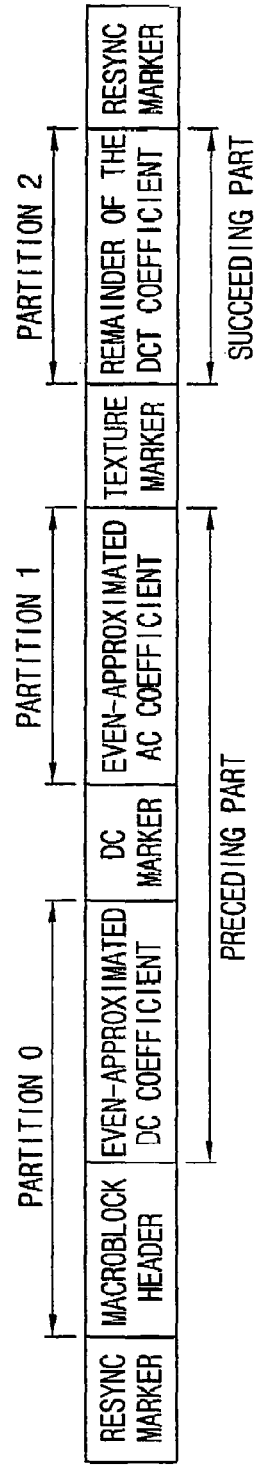

Referring to FIGS. 6A and 6B bit string structures of a data partitioning method in accordance with the present invention are provided. As depicted in FIG. 6A, by fragmenting the DCT coefficient into a preceding part and a succeeding part with a texture marker, frames between screens are partitioned into three regions (partition 0, partition 1, partition 2). In a frame in the screen as shown in FIG. 6B, it is partitioned into an even-approximation part (preceding part) and a rest part (succeeding part), the preceding part is partitioned into a DC coefficient and an AC coefficient. The even-approximated DC coefficient and a macro block header construct a partition 0, the even-approximated AC coefficient is related to a partition 1, and accordingly it is generally partitioned into three regions.

In addition, not the original DC coefficient but the even-approximated DC coefficient is placed in the partition 0 of the frame in the screen, it is possible to reduce information loss probability in the partition 0. In information loss occurrence due to a transmission error, when information loss occurs in the partition 0, all data have to be disregarded, and accordingly it is fatal in most.

Figure 7:
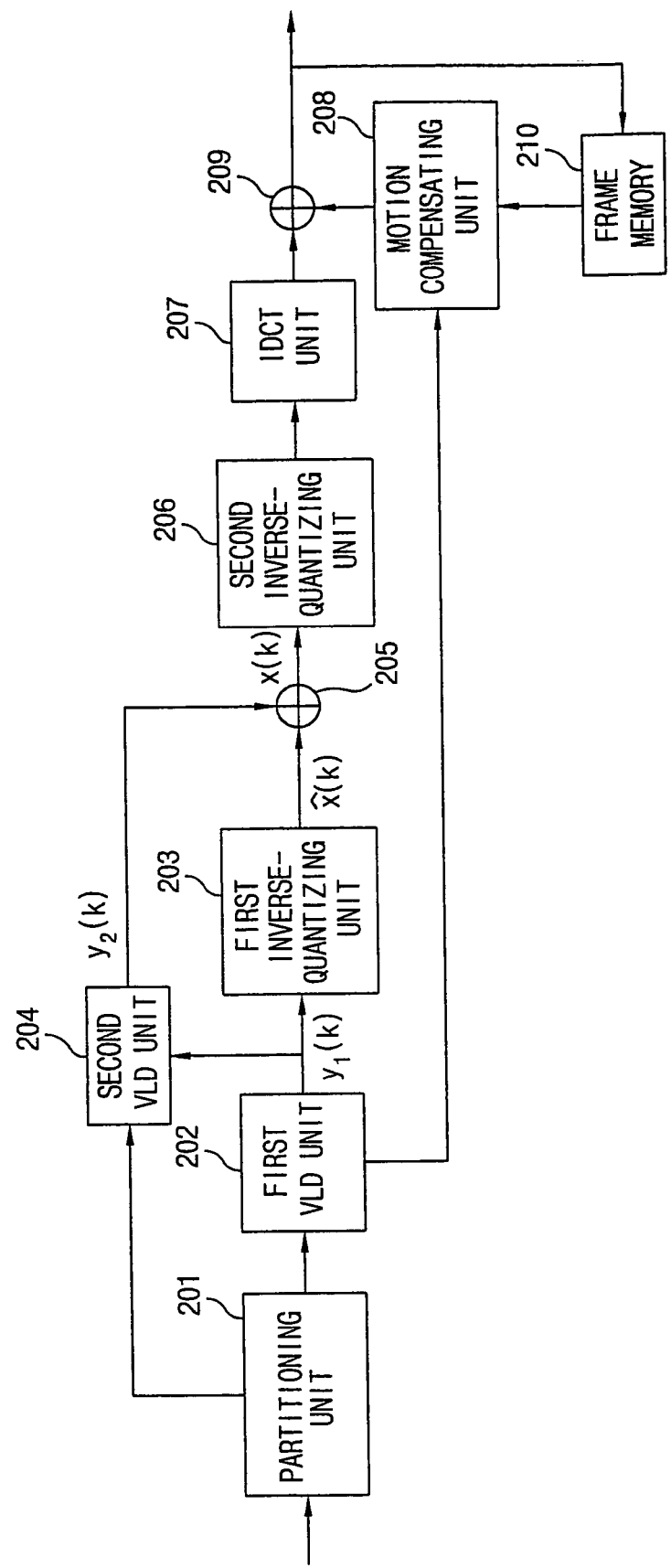
FIG. 7 is a block diagram illustrating a structure of an encoder of the apparatus for partitioning moving picture data in accordance with the present invention.

Referring to FIG. 7, a structure of a decoder used for the data partitioning method is provided. As shown, the decoder comprises a partitioning unit 201 for receiving an encoded bit stream and partitioning it into a preceding part and a succeeding part; a first VLD (variable length decoding) unit for performing VLD of the preceding part of an output signal of the partitioning unit 201 and outputting an even-approximation coefficient; a first inverse-quantizing unit 203 for inverse-quantizing the even-approximate coefficient outputted from the first VLD unit 202 and outputting a preceding part reproduction value; a second VLD unit 204 for performing VLD of the succeeding part of the output signal of the partitioning unit 201 and outputting an odd-remainder coefficient; and a first combining unit 205 for combining the odd-remainder coefficient with the preceding part reproduction value.

In some embodiments, a second inverse-quantizing unit 206 for inverse-quantizing the output signal of the first combining unit 205; an IDCT (inverse discrete cosine transform) unit 207 for performing IDCT of the output signal of the second inverse-quantizing unit 206; a motion compensating unit 208 for performing motion compensation by using the output signal of the first VLD unit 202 and the signal stored in the frame memory 210; a second combining unit 209 for combining the output signal of the motion compensating unit 208 with the output signal of the IDCT unit 207 and outputting a motion-compensated video signal; and a frame memory 210 for storing the signal of the second combining unit 209 are included.

The operation of the decoder of the moving picture data partitioning apparatus in accordance with the present invention will be described. The decoder partitions an inputted bit stream into each partition divided by a marker. $y_1(k)$, as a preceding part, is decoded according to a defined coding table and is doubled in the first inverse-quantizing unit 203. The succeeding part as the odd-remaining coefficient of the even-approximated coefficient is decoded in the second VLD unit 204. In decoding of a run-length of 0 in the succeeding part, additional 1 bit showing code information of the odd-remaining coefficient is decoded only when the even-approximated coefficient is 0. In cases except that, a code of the odd-remaining coefficient is determined as the same code with the odd-approximated coefficient.

A first-quantized coefficient x(k) can be reconstructed by adding the output signal of the first inverse-quantizing unit 203 to the output signal of the second VLD unit 204. In accordance to one embodiment Equation 5 provides:

$$x(k) = \hat{x}(k) + y_2(k)$$
$$= 2y_1(k) + y_2(k), 1 \le k \le 64$$

(Equation 5)

The first-quantized coefficient is added to the signal motion-compensated through the second inverse-quantizing unit 206 and the IDCT unit 207 and is outputted as a decoded video signal. In the decoder in accordance with the present invention, when a transmission error occurs, decoding is performed in order from a preceding part in which loss does not occur, if the preceding part is lost, part lower than the preceding part is disregarded. In more detail, when loss occurs in the partition 2 by a transmission error, decoding is performed through the partitions 0 and 1. When loss occurs in the partition 1, lost macro block is reconstructed through information in the partition 0. And, when loss occurs in the partition 0, the decoder disregards all information.

Figure 8:
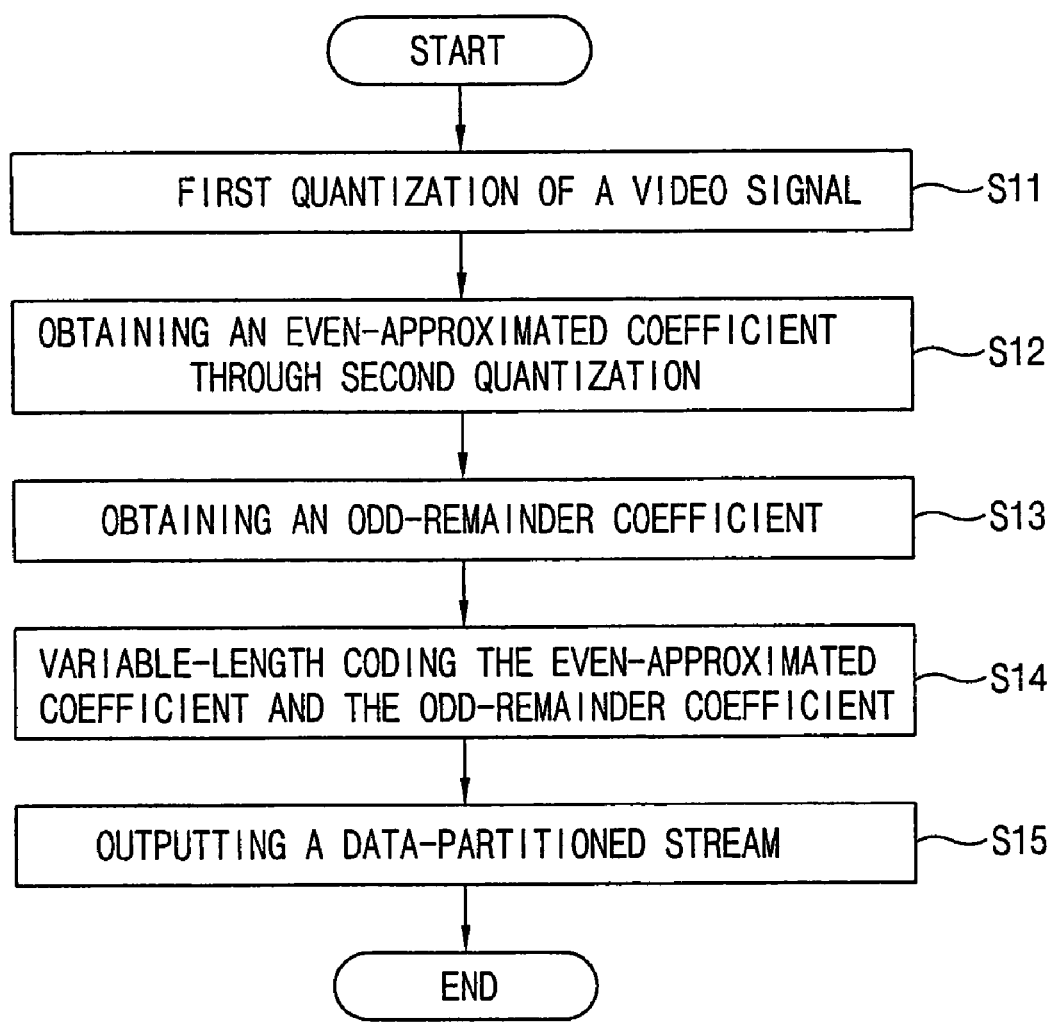
FIG. 8 is a flow chart illustrating a method for partitioning moving picture data in encoding in accordance with one embodiment of the present invention.

Referring to FIG. 8, a data partitioning method in encoding is provided. A received video signal is first-quantized at step S11. The first-quantized signal is outputted. The first-quantized signal is second-quantized, at step S12. Herein, by using 2 as a second quantizing interval, a second quantized output signal is an even-approximated coefficient about the first-quantized signal. The even-approximated coefficient is an approximate stream including all frequency components from a low frequency component as the preceding part and a high frequency part as the succeeding part.

By using the difference between the first-quantized signal and the even-approximated coefficient, an odd-remaining coefficient is calculated as shown at step S13. Herein, the odd-remaining coefficient is corresponded to the succeeding part, absolute value thereof can be described as 0 and 1. Because it has the same code with that of the even-approximated coefficient, when the even-approximated coefficient is 0, for example, and the odd-remaining coefficient is not 0, code information as additional is inserted in order to describe a sign at 1 bit.

For example, a first-quantized signal is { . . . −6, −5, −4, −3, −2, −1, 0, 1, 2, 3, 4, 5, 6 . . . }, even-approximated coefficient is { . . . −3, −2, −2, −1, −1, 0, 0, 0, 1, 1, 2, 2, 3 . . . }, and odd-remainder coefficient is { . . . 0, −1, 0, −1, 0, −1, 0, 1, 0, 1, 0, 1, 0 . . . }. And, because even-approximated coefficient of the first quantized signal {−1, 1} is {0, 0}, a code bit for respectively showing {−1, 1} is inserted into the odd-remainder coefficient.

By performing the variable-length coding of the even-approximated coefficient and the odd-remainder coefficient respectively as shown at step S14, a signal is outputted from the data partitioning unit as a partitioned stream as shown at step S15. Referring to FIG. 9, a data partitioning method in decoding will be described. By receiving the data-partitioned stream signal through the encoder and partitioning data, at step S21 and performing VLD (variable-length coding) of the data, at step S22, an even-approximated coefficient and an odd-remainder coefficient are obtained, at step S23. The even-approximated coefficient is inverse-quantized about the second quantizing in the encoding process. The even-approximated coefficient is added to the odd-remainder coefficient and is outputted as a first-quantized signal.

For example, when the even-approximated coefficient is {... −3, −2, −2, −1, −1, 0, 0, 0, 1, 1, 2, 2, 3 ... }, the odd-remainder coefficient is {... 0, −1, 0, −1, 0, −1, 0, 1, 0, 1, 0, 1, 0 ... }, a second-quantizing interval in the encoding process is 2, the even-approximated coefficient through the inverse-quantizing is outputted as {... −6, −5, −4, −3, −2, −1, 0, 1, 2, 3, 4, 5, 6 ... }, and a signal same with the first-quantized signal in the encoding process is outputted. In the first-quantized signal, inverse-quantizing about the first quantizing in the encoding process is performed at step S24. Motion compensation about the signal is performed, and accordingly a video signal is obtained as shown at step S25.

The apparatus and method for partitioning moving picture data in accordance with the present invention can be efficiently used for not only a radio terminal using a radio communication network but also error impurity transmission of moving picture information in a wire communication network. And, it can be applied to not only moving picture transmission such as a MPEG-2, a MPEG-4 and a H.263, etc. but also still picture transmission such as a JPEG (joint photographic coding expert group), etc. The present invention can be efficiently applied to error impurity transmission of all multimedia information encoded by using a DCT in a wire/wireless communication network.

As described above, in the apparatus and method for partitioning moving picture data in accordance with the present invention, by including all frequency components from a low frequency part to a high frequency part, reproduction picture quality can be improved in comparison with the conventional art decoding only a specific part.

In addition, in the apparatus and method for partitioning moving picture data in accordance with the present invention, by dividing a DCT coefficient into an even-approximated coefficient and an odd-remainder coefficient through re-quantization and respectively allocating them to a preceding part and a succeeding part, it is possible to decrease a length of a code word and reduce loss probability at the preceding part. Thus, in accordance with one embodiment of the present invention, by decreasing code information at a succeeding part, it is possible to perform efficient encoding.

What is claimed is:

1. A method for partitioning moving picture data, the method comprising:
   generating a first-quantized signal by first-decoding a received stream,
   wherein first decoding comprises dividing the received stream into a preceding part and a succeeding part, variable-length decoding and inverse-quantizing the preceding part, variable-length decoding the succeeding part, and outputting the first-quantized signal by adding the preceding part to the succeeding part; and
   restoring a video signal by second-decoding the first-quantized signal.

2. The method of claim 1, wherein the preceding part is an even-approximated coefficient.

3. The method of claim 1, wherein the succeeding part is an odd-remainder coefficient.

4. A system for partitioning moving picture data, the system comprising:
   a first inverse-quantizing mechanism for generating a first-quantized signal by first-quantizing a preceding part and a succeeding part of a data-partitioned stream,
   wherein the first inverse-quantizing unit comprises a divider for dividing the received data-partitioned stream into the preceding part and the succeeding part, a first variable length decoder (VLD) for performing variable-length decoding of the preceding part to generate a first output signal, a first inverse-quantizer for inverse-quantizing the first output signal of the first VLD, a second VLD for performing variable-length decoding of the succeeding part, and a first combiner for outputting a first-quantized signal by combining an output signal of the first inverse-quantizer with an output signal of the second VLD; and
   a second inverse-quantizing mechanism for outputting a video signal by performing inverse-quantization and inverse discrete cosine transform of the first quantized signal.

5. The system of claim 4, wherein an output signal of the first VLD is an even-approximated coefficient.

6. The apparatus of claim 4, wherein an output signal of the second VLD is an odd-remainder coefficient.

* * * * *